United States Patent Office

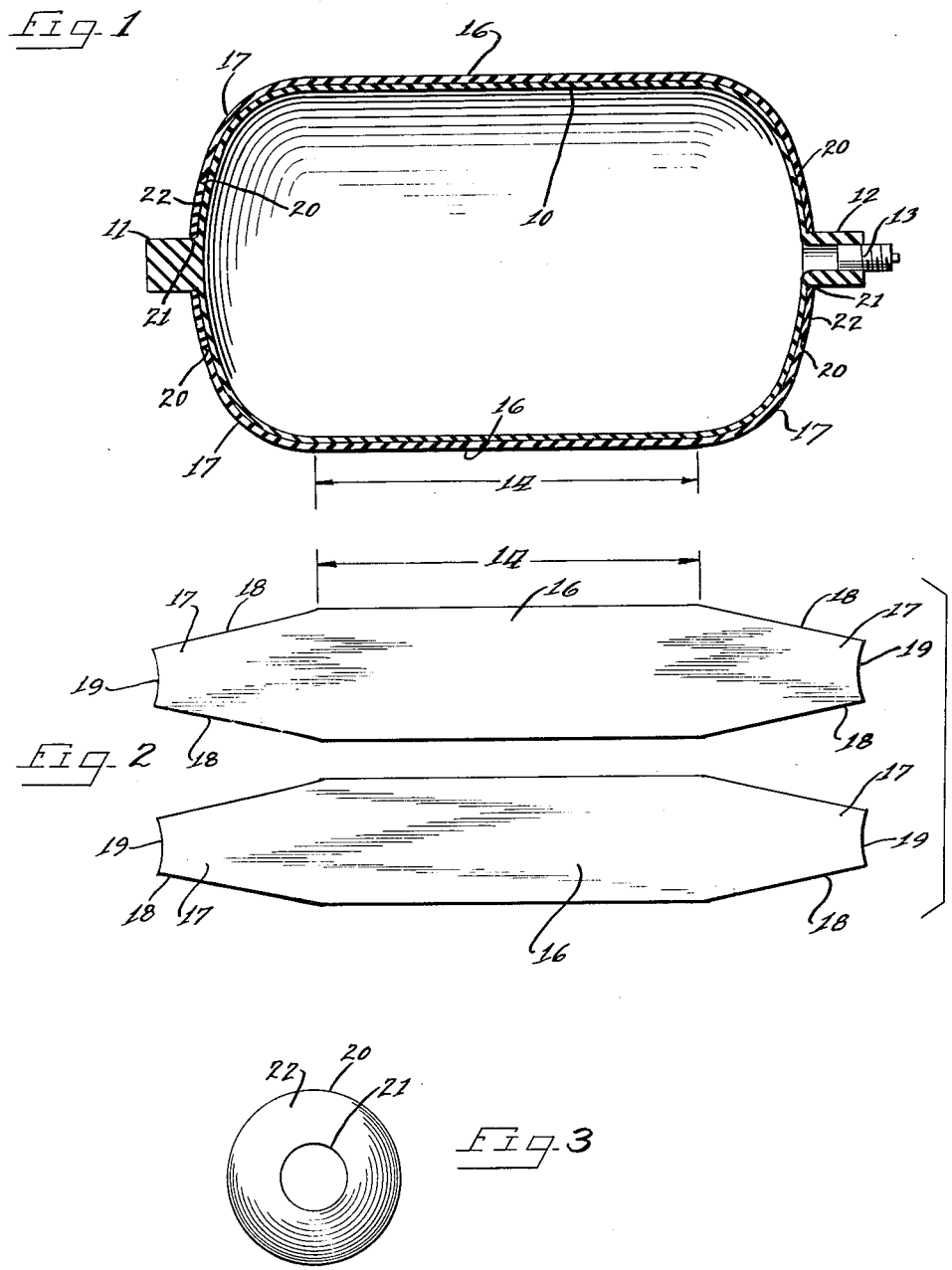

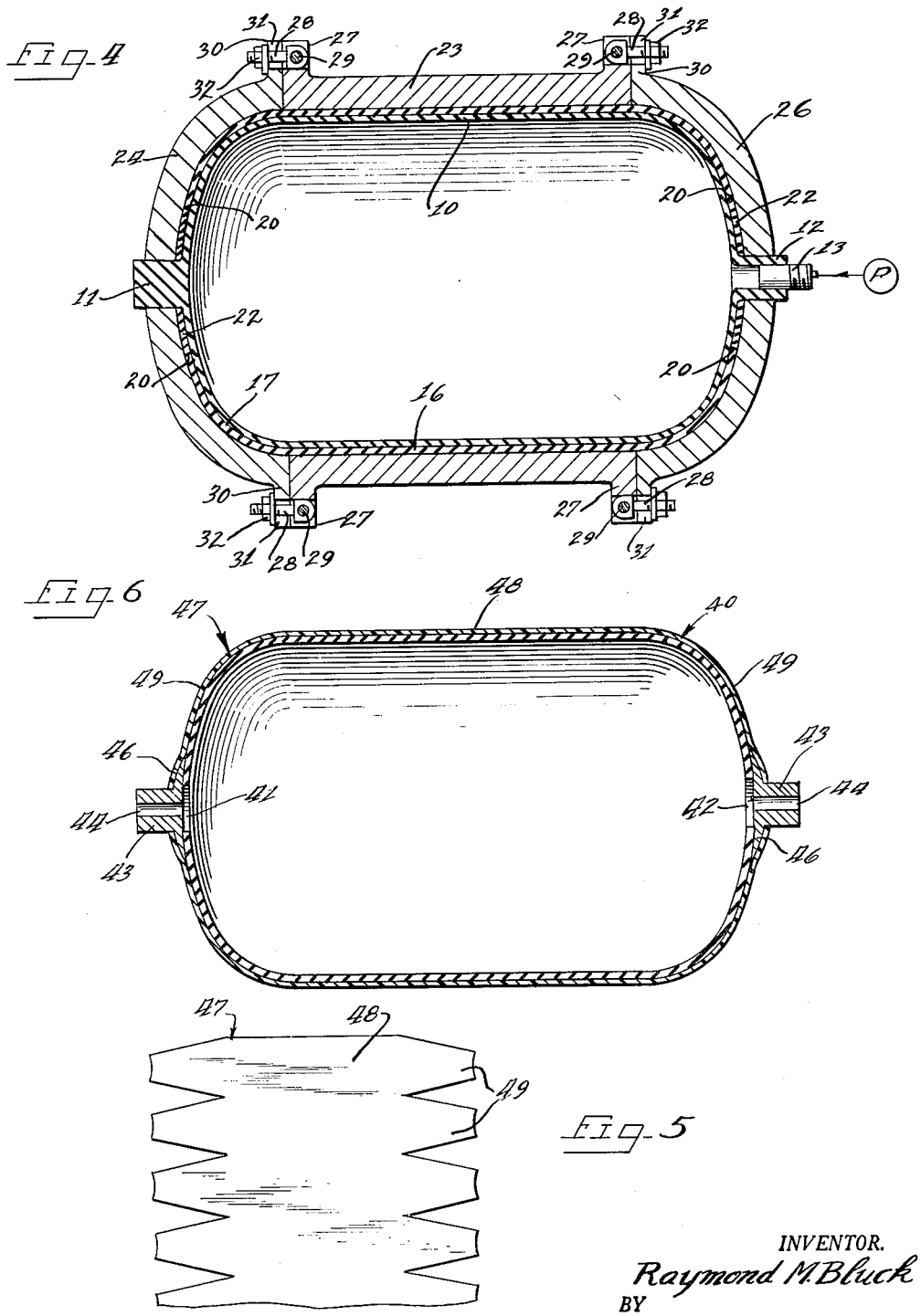

3,210,228
Patented Oct. 5, 1965

3,210,228
METHOD AND APPARATUS FOR MAKING A
FILAMENT WOUND PRESSURE VESSEL
Raymond M. Bluck, Willowick, Ohio, assignor to
TRW Inc., a corporation of Ohio
Filed July 6, 1961, Ser. No. 122,310
6 Claims. (Cl. 156—172)

This invention relates generally to expansible mandrels and more particularly relates to an improved method and apparatus for providing a reference contour for filament winding of pressure vessels.

The established current conventional methods for providing a reference contour in filament winding pressure vessels is to use a rigid removable mandrel of soluble salt, melt out resin or wax, break-away plaster and segmented metal.

All of such types of prior art mandrels fail to compensate for two fiber relaxing effects which occur during the filament winding process. These effects are (1) the applied external pressure due to tension in the windings as applied causes compression in the underneath windings and (2) the culmination of slight bulk reduction during the cure of the resin matrix due to minute flow permits closer fiber nesting and consequent relaxation of tension.

In accordance with the principles of the present invention, a method of achieving uniform fiber loading through compensation for relaxation effects occurring during winding is provided.

Briefly described, an elastomeric film or some other suitable ductile material is utilized to form a bladder to exact desired internal configuration of a pressure vessel. The bladder is suitably rigidized, for example, if an elastomeric material is utilized, a thin glass cloth resin laminate may be mated over the bladder. The thus rigidized bladder is supported on a shaft connected to end fittings bonded to the bladder and is placed in a winding machine. During the winding operation the internal pressure within the bladder is increased to compensate for the increasing applied external pressure due to the tension of applied fibers. During cure of the resin matrix, a sufficiently higher additional pressure is applied to insure slight expansion sufficient to compensate for bulk reduction due to resin flow and closer nesting of the glass filaments.

It is an object of the present invention, therefore, to provide an improved expansible mandrel.

Yet another object of the present invention is to provide improved methods and means for providing a reference contour in filament winding pressure vessels.

A still further object of the present invention is to provide a mandrel which will compensate for the fiber relaxing effects which are likely to occur during a filament winding process.

Still another object of the present invention is to provide a mandrel for a filament winding process which compensates for the applied external pressure due to tension in windings as the application of the windings causes compression in windings already applied.

Yet another object of the present invention is to provide a mandrel which compensates for the culmination of slight bulk reduction which occurs during the cure of the resin matrix due to minute flow and which permits closer fiber nesting and consequent relaxation of tension.

Another object of the present invention is to provide an improved method of pressure vessel construction which increases the ultimate strength achievable.

Many other features, advantages and additional objects of the present invention will become manifest to those versed in the art upon making reference to the detailed description which follows and the accompanying sheets of drawings in which various steps followed in the practice of the present invention are illustrated and wherein some of the components utilized in practicing the principles of the present invention are illustrated in exemplary embodiment.

On the drawings:

FIGURE 2 shows gores of an elastomeric film or other suitable ductile material, while FIGURE 3 shows a typical end cap made of the same material and FIGURE 1 shows the gores of FIGURE 2 and two end caps as shown in FIGURE 3 mounted in adjoining abutment on the peripheral surface of a flexible mammy bag prior to a curing operation;

FIGURE 4 shows the assembled parts and the mammy bag positioned within a rigid mold by means of which the separate parts may be integrated into a bladder;

FIGURE 5 shows a developed fragmentary view of a thin glass cloth resin laminate; and FIGURE 6 shows the rigid resin laminate of FIGURE 5 mated with the bladder and with end fittings bonded to the bladder on the vessel axis.

As shown on the drawings:

Although the principles of the present invention are of general applicability to any mandrel construction or to any method wherein an expansible mandrel may be effectively employed, a particularly useful application of the principles of the present invention is made in providing a reference contour for filament winding of pressure vessels, for example, motor casings.

It is contemplated by the present invention that an elastomeric film be utilized for forming a bladder to the exact desired internal configuration of the pressure vessel. Although an elastomeric material may be employed, it is also contemplated that thin ductile metal bladders or aluminum, steel and other materials could be utilized.

To form the bladder to the exact desired internal configuration of a pressure vessel, a so-called mammy bag may be advantageously employed. The mammy bag is shown at 10 and includes an end hub portion 11, as well as a neck 12 receiving a coupling 13 by means of which the internal portions of the mammy bag 10 may be connected to a suitable source of pressure such as a pump P.

In the illustrative embodiment herein described, it is contemplated the pressure vessel will constitute an article having a cylinder with generally elliptical or ellipsoidal heads. Accordingly, as shown in FIGURE 2, a plurality of gores made of a suitable elastomeric or other ductile material are provided. Each gore includes a center portion extending between the dimensions indicated at 14 and indicated in FIGURE 2 at 16, the respective end portions of the gores being shown at 17 and having tapered sides 18. The end extremity of the end portion 17 is slightly curved as at 19.

A pair of end caps made of the same elastomeric material may be provided as shown in FIGURE 3, the end cap comprising an annular member having an outer peripheral edge 20, an inner peripheral edge 21 and an annular body portion 22.

The gores and end caps are placed on the external peripheral surface of the mammy bag 10 and are confined within a rigid mold, for example, a three-part mold as shown in FIGURE 4 which includes a center body portion 23 and two end caps 24 and 26, respectively. The body portion 23 is flanged as at 27 and carries a plurality of studs 28, each hinged as at 29. Each of the end members 24 and 26 is likewise flanged as at 30 and the flange is provided with slots 31 cooperating with the studs 28 and by means of which locking nuts 32 may be used to clamp the components of the mold in firm assembly with one another.

In order to effectively confine the elastomeric material within the mold 23, 24, 26, the mammy bag 10 is inflated under pressure and there is shown in FIGURE 4 a pump P connected to the fitting 13 by means of which pressure is supplied to the interior of the mammy bag. It will be understood that the mold is subjected to proper curing conditions depending upon the nature of the elastomeric material, in other words, the mold may be placed in a suitable temperature environment for a predetermined length of time and at a predetermined elevated temperature, whereupon the gores and end pieces will be integrated into a bladder having the exact desired internal configuration of the pressure vessel.

The integrated bladder is shown at FIGURE 6 and is given a new reference numeral for purposes of easy identification as at 40.

The bladder 40 has a pair of axial end openings 41 and 42 through one of which the mammy bag is removed following removal from the mold and deflation of the mammy bag 10.

Thereafter, end fittings are bonded to the bladder. In this particular embodiment, each end fitting is shown as comprising a hub 43 having a centrally disposed passage 44 and being flanged as at 46. One side of the flange 46 is engaged against the outer peripheral surface of the bladder 40 and on the bladder axis in register with a corresponding opening 41 or 42. A suitable adhesive may be employed to bond the end fitting 43 in firm assembly with the bladder 40.

It is desirable that the bladder 40 be rigid at the desired configuration when a low internal pressure is contained within the bladder 40, for example, the bladder could be rigidized by glass fiber within the bladder wall, however, in this particular embodiment there is shown in FIGURE 5 a thin, rigid resin laminate of glass cloth shown generally at 47 and including a body portion 48 and serrated end portions 49. The laminate 47 is mated over the bladder 40 with the serrated end portions 49 overlapping the flanges 46 of the respective end fittings 43.

The bladder thus rigidized is supported on a shaft connected to the bonded end fittings 43, 43 and is placed in a winding machine.

During the winding operation, one or the other of the passages 44 in the end fittings 43, 43 is connected to a suitable source of pressure so that the internal pressure of the bladder is increased to compensate for the increasing applied external pressure due to the tension of the applied filaments or fibers. This increasing internal pressure causes a slight expansion sufficient to insure that all applied windings will remain taut. Those versed in the art will recognize that the windings contemplated for use in the production of a pressure vessel such as a motor casing may constitute either impregnated fibers or else plain fibers or filaments may be applied to the vessel and a resin applied to the wound article. In any event, following the fabrication of the wound article over the mandrel, the wound article is subjected to a curing operation. In practice the necessary rigidification of the bladder is effected at low internal pressures in the order of about 25 to 50 p.s.i. In accordance with the principles of the present invention, during cure of the resin matrix, a sufficiently higher additional pressure is applied to the interior of the bladder 40 through the passage 44 in one of the end fittings 43 to insure slight expansion sufficient to compensate for bulk reduction due to resin flow and closer nesting of the glass filaments.

Thus, in accordance with the principles of the present invention, the two most serious fiber relaxing effects which occur during the filament winding process are fully compensated for. The invention thus described offers a method of achieving uniform fiber loading through compensation for relaxation effects occurring during winding which reduce uniformity of fiber loading and reduce ultimate strength that may be achieved.

Moreover, by virtue of the methods and apparatus provided, difficult operations for mandrel removal are eliminated. The inflated mandrel will normally form the sealing liner for the finished pressure vessel but may be easily collapsed and withdrawn if desired.

Although minor modifications might be suggested by those versed in the art, it should be understood that I wish to embody within the scope of the claims herein all such modifications as reasonably and properly come within the scope of my contribution to the art.

I claim as my invention:

1. A method of providing a reference contour for filament winding of pressure vessels which includes the steps of forming an elastomeric film in the shape of a bladder shaped to the desired internal configuration of the pressure vessel, rigidizing the bladder sufficiently to be rigid at the desired configuration at low internal pressures in the order of about 25 to 50 p.s.i., winding filamentous material on the rigidized bladder under tension, and concurrently with the winding step increasing the internal pressure in the bladder in sufficient amount to compensate for the increasing applied external pressure during winding due to the tension of the applied filamentous material.

2. The method of filament winding pressure vessels such as motor casings which include the steps of
   forming an elastomeric film in the shape of a bladder shaped to the desired internal configuration of the pressure vessel, rigidizing the bladder sufficiently to be rigid at the desired configuration at low internal pressures in the order of about 25 to 50 p.s.i.,
   winding filamentous material on the rigidized bladder, concurrently with the winding step increasing the internal pressure in the bladder,
      in an amount sufficient to compensate for the increasing applied external pressure during winding due to the tension of the applied filamentous material,
   and thereafter applying a resin to the wound article.

3. The method of claim 2 further characterized by the additional step of
   heat curing the article following fabrication of the wound article over the mandrel.

4. The method of claim 3 further characterized by the additional step of
   applying a sufficiently higher additional pressure to the interior of the bladder during the heat curing of the wound article to insure slight expansion sufficient to compensate for bulk reduction due to resin flow and closer nesting of the glass filaments.

5. In a method of making filament wound pressure vessels, the steps of winding filamentous material on a flexible expansible material mandrel in the shape of a bladder having the configuration when inflated corresponding to the desired internal configuration of the pressure vessel under tension and increasing the pressure within said flexible expansible mandrel to slightly expand the mandrel during winding and to thus compensate for the increasing applied external pressure due to the tension of applied filamentous material.

6. A filament winding mandrel comprising an elastomeric film shaped to form a bladder having a reference contour on its peripheral surface, a rigidizing thin resin laminate of glass cloth mated to the peripheral surface of said bladder, and fittings comprising a hub and a neck bonded to said bladder for supporting said bladder in a winding machine, said fittings being disposed on the axis of rotation of said bladder and forming axial air passage means through which a pressurizing fluid may be introduced into the interior of the bladder during a winding operation.

References Cited by the Examiner

UNITED STATES PATENTS

| | | | |
|---|---|---|---|
| 2,157,580 | 5/39 | Voit et al. | 220—3 |
| 2,253,291 | 8/41 | Fraknoi | 156—196 |
| 2,272,704 | 2/42 | Harding | 156—294 XR |
| 2,302,985 | 11/42 | Voit et al. | 156—162 |
| 2,688,488 | 9/54 | Crowley | 220—3 |
| 2,744,043 | 5/56 | Ramberg | 156—161 XR |
| 2,988,240 | 6/61 | Hardesty | 220—3 |
| 3,057,509 | 10/62 | Bernd | 220—3 XR |
| 3,070,479 | 12/62 | Meyer | 156—196 |
| 3,074,585 | 1/63 | Koontz | 220—3 |
| 3,114,665 | 12/63 | Wiltshire | 156—155 |

EARL M. BERGERT, *Primary Examiner.*